Patented Feb. 19, 1924.

1,484,088

UNITED STATES PATENT OFFICE.

JOHN W. SCHUMACHER, OF DETROIT, MICHIGAN, ASSIGNOR TO ACME WHITE LEAD AND COLOR WORKS, OF DETROIT, MICHIGAN, A CORPORATION OF MICHIGAN.

LEAD COMPOUND AND PROCESS OF FORMING THE SAME.

No Drawing. Application filed October 18, 1920. Serial No. 417,666.

*To all whom it may concern:*

Be it known that I, JOHN W. SCHUMACHER, a citizen of the United States of America, residing at Detroit, in the county of Wayne and State of Michigan, have invented certain new and useful Improvements in Lead Compounds and Processes of Forming the Same, of which the following is a specification.

The present invention, in its broader aspect, relates to the manufacture of precipitated lead compounds and among the various products producible by the employment of my invention I may mention chrome yellow, chrome orange, chrome red, chrome greens, and other precipitated lead compounds besides pigments, for example, lead arsenate.

The invention also comprises, specifically, the manufacture of lead chromate pigments and has for a specific object the reduction in cost and the obtaining of a high grade or good quality product.

With my improved process the cost of manufacture is reduced by dispensing in large part with the use of acetic or nitric acids and substituting the cheaper sulfuric acid.

The invention comprises as an essentially novel feature the conversion of the starting material, which may consist of litharge, or other lead compound, or in some instances of metallic lead, into a liquid sludge containing essentially a precipitated basic sulphate of lead (in a novel condition herein more fully described), in an aqueous liquid, which preferably also contains, in all cases, some dissolved lead.

The basic lead sulphate which forms an ingredient of the intermediate product in the process of the present application, differs essentially from basic lead sulphate heretofore prepared, especially in that it is much more voluminous than the basic lead sulphates heretofore prepared, settles out much more slowly from the liquid, is in a highly colloidal-solution-suspension condition, in which it will readily react with precipitating agents, such as chromate or bichromate, or arsenate, or the like, without apparently passing through a soluble stage. The lead basic sulphate is in what may be termed an "exfoliated" condition, apparently entirely amorphous. The liquid containing the precipitate in some respects resembles in physical appearance, a liquid containing aluminum hydrate, but the precipitated material is much whiter and more opaque than precipitated aluminum hydrate. The basic sulphate will react readily with soluble chromates or bichromates to produce lead chrome colors of greater purity of tone (both in the original condition and when mixed with white or other pigments) than those made from any other basic lead salts known to me, and on account of this greater reactivity the completion of the chromate reaction will be effected in a much shorter time than when using other insoluble basic lead compounds with which I am familiar. The precipitate is also characteristic in that it is highly basic; it settles much more slowly than any of the basic sulphates of lead with which I am familiar.

In a general way the complete process can be described as consisting essentially of (1) adding to a suitable lead-bearing material, for example, litharge, a small quantity of an acid capable of reacting with such lead-bearing material to produce lead compounds which are somewhat soluble. For example, I may add nitric acid, acetic acid, and in some instances, hydrochloric acid, to the litharge suspended in a suitable volume of water, and the amount of acid so used will preferably be a small fraction only, say 10% or even less, of that quantity of the acid which would be required to react with the lead-bearing material to convert the whole of the latter into a normal salt. (2) To the mixture is also added (preferably after the addition of the nitric, acetic or hydrochloric acid) an amount of sulphuric acid capable of reacting with the lead-bearing material to produce a mixture of basic lead sulphate and basic lead acetate, nitrate, or chloride. The amount of sulphuric acid employed will vary considerably, depending upon the particular result which it is desired to produce, but should in all cases be substantially less than that amount which when added to the amount of other acid above described, would convert all of the lead-bearing material into normal lead salts. The amount of basicity of the reaction mass at this stage can be and should in practice be carefully controlled, although within rather wide limits, since the particular shade or tone of color as well as the other properties of the final product will depend to a considerable extent upon the basicity of the reaction mass to which the precipitating agent is to be added. (3) Having now added the sulphuric acid, the mixture is preferably heated and agitated for a considerable period, for the purpose of bringing the reaction to as near completion as possible. This liquid is then ready (after cooling if desired) for adding the chromate solution.

The best mode of operation of the process known to me is as follows:—

The lead oxide, for example, litharge, is suspended in a considerable bulk of water, and the agitation is commenced, which agitation is continued thereafter up to the end of the process, preferably continuously. The nitric acid or acetic acid is then added, and after a short time it will be found that all of the acid is combined with the litharge. The sulphuric acid is then run in, preferably quite slowly, for example, as a thin stream, and steam is turned into the liquid mass for the purpose of heating the same approximately up to the boiling temperature. It is advisable to run in the steam rapidly, so as to bring the liquid mass to the boiling temperature as soon as possible. The steam can then be shut off, and the liquid mass is kept well agitated for a considerable period after this, in order for the reaction to complete itself. This may require about fifteen or twenty minutes after the liquid mass has reached the boiling temperature, when the steam is shut off.

In order to more fully explain the invention the following specific examples are given, it being understood that the scope of the invention is by no means restricted to the details of these examples.

Example 1: 223 pounds of litharge are suspended in, say, 200 gallons of water, and to the mass is added 20 pounds of nitric acid of about 1.42 gravity. After continuing the agitation for a few minutes, 50 pounds of sulphuric acid of 1.84 gravity are then slowly run in, as a thin stream, while the agitation is continued. As soon as all of the sulphuric acid has been run in, steam is introduced into the bottom of the tank, for the purpose of heating the liquid mass to the boiling point, and when this condition has been reached, the admission of steam is shut off. The agitation is continued for another fifteen or twenty minutes, or so. This liquid is then conducted to a precipitation vat and a solution of 130 pounds of sodium bichromate is added, for the purpose of producing a precipitate of chrome yellow of a medium shade. Chrome yellow made in this manner will be found to contain always larger percentages of lead sulphate than chrome yellow made by the regular nitrate process of the prior art, but the product has otherwise substantially the same properties and characteristics as the nitrate yellow, which is always more highly prized than the acetate yellow, on account of its better tone, tint and color.

Example 2: For the production of a light chrome yellow, 440 pounds of litharge are suspended in 600 gallons of water, 30 pounds of nitric acid are added, and after a few minutes sulphuric acid is slowly run in until 100 pounds has been added. The liquid mass is kept stirred or agitated and is brought to the boiling point by the introduction of steam. This produces a snow-white suspension containing a basic sulphate of lead and other lead compounds. When the reaction has been completed, the liquid mass is run into a precipitation vat and is allowed to cool. A solution of 175 pounds of sodium bichromate dissolved in 300 gallons of water, and to which is added 30 pounds of sulphuric acid, is slowly run into the precipitation vat while the liquid mass is well agitated, thereby producing the formation of light chrome yellow. The yellow precipitate is settled, washed, filter-pressed, and subsequently treated in the conventional well-known manner.

In some instances, it is advisable to add ammonium compound, such as ammonium sulphate, before adding the sulphuric acid, the ammonium compound acting as a stimulating agent. A small amount, say 5 to 10%, of such ammonium compounds are frequently helpful, by making the reaction more rapid and hence shortening the time of conversion.

It is to be understood that while I have referred to the employment of nitric acid, acetic acid, or in some cases, hydrochloric acid, as the agent for forming a somewhat soluble lead compound in the commencement of the operation, salts of these acids could likewise be used, for example, the sodium, potassium, ammonium, aluminum, magnesium, calcium, strontium, zinc, or lead salts of nitric acid, acetic acid, or hydrochloric acid. Other salts having a like effect could also be employed; either all of the acid or a portion of the acid could be replaced in this manner by the corresponding salts.

In certain cases it is possible to start with metallic lead instead of the lead oxide, for example, when acetic acid is used.

I have above referred to the addition, first, to the litharge and water, of the nitric acid and then the sulphuric acid. In some cases it would be possible to alter the order of addition of these substances, or in fact the substances employed in the production of the basic lead sulphate can be added in any desired order, but the order above stated is preferable as being the most practicable.

The lead chromate pigments made in accordance with the present process are found to be much more permanent than any of the lead chromate pigments made from ordinary basic lead sulphates. When nitric and sulphuric acids are used in accordance with the present process, the product invariably contains some lead sulphate, but the clearness of color and tone are at least equal to those of any lead chromate known to me, made by precipitating a solution of lead nitrate with a chromate solution. The pigments are also characterized by being extremely permanent as to color when used in the manufacture of paint, enamel, and the like.

In some industries there is produced as a by-product, neutral sulphate of lead precipitate. I have found that by taking this material in the form of a pulp, adding a small amount, say 3 to 5% or so, of nitric acid (or a corresponding amount of salts as above mentioned), boiling, agitating, and then slowly adding litharge, basic lead sulphate of the character above described can be prepared, of varying degrees of basicity. These basic lead sulphates can be used to produce good commercial chromate pigments, or lead insecticides, by precipitation in the manner above described.

It is of course well understood in the art that the darker shades of chrome yellow are basic lead chromates of varying degrees of basicity, and these more basic products are ordinarily produced by producing a more basic condition and raising the temperature in the precipitation vats, which is the conventional mode of producing the darker shades.

A particular advantage of the present process, which cheapens the production of lead chromate pigments, is the fact that it is possible to entirely use up all of the lead and all of the chromate radical going into the process, and it is not necessary to use either a substantial excess of lead compounds or a substantial excess of chromate compounds, as is necessary with many of the processes of making lead chromate pigments heretofore in use.

In the precipitation of lead chromate pigments, by reacting upon the sludge containing the described basic lead sulphate with a solution of a chromate or bichromate, either the chrome solution can be added to the lead liquid mass, or vice versa.

What I claim as my invention is:

1. A product adapted for making lead pigments, comprising a suspension of a white, exfoliated, relatively voluminous, opaque basic lead compound embracing sulphate in an aqueous vehicle containing a relatively small amount of a dissolved lead compound.

2. A new basic lead sulphate, characterized by being a snow-white, opaque, exfoliated, water-insoluble material, much more voluminous and slower settling in water, as well as more basicified and more readily reactive than the ordinary basic lead sulphates.

3. In the manufacture of lead compounds, the herein-described improvement which comprises adding to lead oxide, an acid capable of reacting therewith, with the production of a somewhat soluble lead compound, such acid being added in an amount very much less than the amount necessary to produce a normal lead salt of such acid from the amount of lead oxide used, adding sulphuric acid to the mixture, the amount of sulphuric acid being, with the amount employed of said other acid, sufficient to form a basic lead sulphate and a basic lead salt of such other acid, from all of the lead oxide present, agitating the mass and maintaining the same at a temperature adapted to produce basic lead salts.

4. In the manufacture of lead compounds, the herein-described improvement which comprises adding to lead oxide, an acid capable of reacting therewith, with the production of a somewhat soluble lead compound, such acid being added in an amount very much less than the amount necessary to produce a normal lead salt of such acid from the amount of lead oxide used, adding sulphuric acid to the mixture, the amount of sulphuric acid being, with the amount employed of said other acid, sufficient to form a basic lead sulphate and a basic lead salt of such other acid, from all of the lead oxide present, agitating the mass and maintaining the same at a temperature adapted to produce basic lead salts, and thereafter adding to the reaction mixture, a salt of an acid capable of precipitating an insoluble lead compound, from such basic lead salts.

5. In the manufacture of lead compounds, the herein-described improvement which comprises adding to lead oxide, an acid capable of reacting therewith, with the production of a somewhat soluble lead compound, such acid being added in an amount very much less than the amount necessary to produce a normal lead salt of such acid from the amount of lead oxide used, adding sulphuric acid to the mixture, the amount of sulphuric acid being, with the amount employed of said other acid, sufficient to form a basic lead sulphate and a basic lead salt of such other acid, from all of the lead oxide present, agitating the mass and maintaining the same at a temperature adapted to produce basic lead salts, adding a chromate compound to such mixture to precipitate a lead chromate compound.

6. The improvement in the treatment of lead sulphate which comprises incorporating the same with lead oxide in an aqueous vehicle in the presence of a soluble compound containing an acid radical, the normal lead salt of which acid is soluble.

7. A process of making a liquid sludge carrying basic lead compounds, which comprises reacting on a plumbiferous material with a fraction only of the chemically equivalent amount of an acid of which the normal lead salt is somewhat soluble, then reacting on the product with sulphuric acid in such quantity as to produce basic lead compounds.

8. A product adapted for making lead pigments, comprising a suspension of a relatively large amount of a white, exfoliated, relatively voluminous, opaque basic lead compound embracing sulphate in an aqueous vehicle containing a relatively small amount of a dissolved lead compound, such product being capable of producing, by reaction with soluble chromate, lead chromate colors of greater purity of tone both in their original condition and when mixed with white pigments, than those produced from other basic lead sulphate, being capable of much more rapid reaction with chromate than other basic lead sulphates, and being slower settling in aqueous liquids than other basic lead sulphates.

9. A process which comprises reacting on litharge with a re-agent capable of producing a somewhat soluble lead compound and a re-agent capable of producing a basic lead sulphate, maintaining the suspension hot until the basic lead sulphate possesses an amorphous highly reactive character, capable of readily reacting with alkali metal chromate solution.

10. A process which comprises reacting on litharge with a reagent capable of producing a somewhat soluble lead compound, and a reaction-stimulating agent.

11. In the manufacture of a reaction liquid containing basic lead sulphate in amorphous condition, the step of adding sulphuric acid to a mixture containing water, and the reaction products of litharge and a soluble lead compound.

12. In the manufacture of a reaction product containing hydrated highly reactive basic lead sulphate, the herein-described steps of mixing and heating (a) a material containing the sulphate radical, (b) an aqueous liquid, (c) a soluble lead compound, and (d) a basic lead compound, such ingredients being added in any desired order, and some of such ingredients being added in the form of materials capable of producing the same.

13. In the manufacture of a reaction product containing hydrated highly reactive basic lead sulphate, the herein-described steps of mixing and heating (a) a material containing the sulphate radical, (b) an aqueous liquid, (c) a soluble lead compound, and (d) a basic lead compound, such ingredients being added in any desired order.

14. A process which comprises reacting upon exfoliated basic lead sulphate with a precipitant.

15. A process which comprises reacting upon exfoliated basic lead sulphate with a chromate salt.

16. In the manufacture of precipitated lead products, the improvement which comprises employing a slow-setting, exfoliated, highly reactive basic lead sulphate.

17. In the manufacture of lead compounds, the herein-described improvement which comprises adding to lead oxide suspended in water, a soluble compound capable of leaving a soluble lead salt in the liquid mass, the amount of said compound being insufficient to convert all of the lead of the lead oxide into a dissolved lead salt, adding a material containing the sulphate radical in amounts sufficient to convert all the remaining lead oxide into a basic lead compound, and agitating and heating until the reaction is substantially complete.

18. In the manufacture of lead compounds, the herein-described improvement which comprises adding to lead oxide suspended in water, a soluble acid capable of leaving a soluble lead salt in the liquid mass, the amount of said acid being insufficient to convert all of the lead of the lead oxide into a dissolved lead salt, adding a material containing the sulphate radical in amounts sufficient to convert all the remaining lead oxide into a basic lead compound, and agitating and heating until the reaction is substantially complete.

19. In the manufacture of lead products, the herein-described improvement which comprises adding to litharge suspended in water, an amount of an acid representing much less than the amount of such acid capable of producing solution of the entire amount of litharge, the said acid being one which is capable of forming a soluble lead salt, and adding sulphuric acid in such amount that the quantity of the first mentioned acid added plus the quantity of sulphuric acid is approximately sufficient to convert the entire amount of litharge into a basic lead salt, agitating and heating until the reaction is substantially complete.

20. In the manufacture of lead products the herein-described improvement which comprises adding to litharge suspended in water, an amount of nitric acid representing much less than the amount of nitric acid capable of producing solution of the entire amount of litharge, and adding sulphuric acid in such amount that the quantity of nitric acid plus the quantity of sulphuric acid is sufficient to convert the entire amount of litharge into a basic lead salt, agitating and heating until the reaction is substantially complete.

21. A process of producing precipitated lead compounds which comprises the step of reacting upon a slow-settling exfoliated, highly reactive basic lead sulfate, with a precipitating agent, whereby the lead precipitate is produced in a highly amorphous and finely divided state.

22. A process of producing precipitated lead compounds which comprises the step of reacting upon a slow-settling exfoliated, highly reactive basic lead sulfate, with a soluble chromic acid compound, whereby the lead precipitate is produced in a highly amorphous and finely divided state.

23. A process of producing precipitated lead compounds which comprises the step of reacting upon a slow-settling exfoliated, highly reactive basic lead sulfate, admixed with an aqueous vehicle.

In testimony whereof I affix my signature.

JOHN W. SCHUMACHER.